3,188,167
TREATMENT OF EXHAUST GASES
Charles A. Specht, Englewood, N.J., assignor to Minerals & Chemicals Philipp Corporation, Menlo Park, N.J., a corporation of Maryland
Filed July 12, 1961, Ser. No. 123,433
1 Claim. (Cl. 23—2)

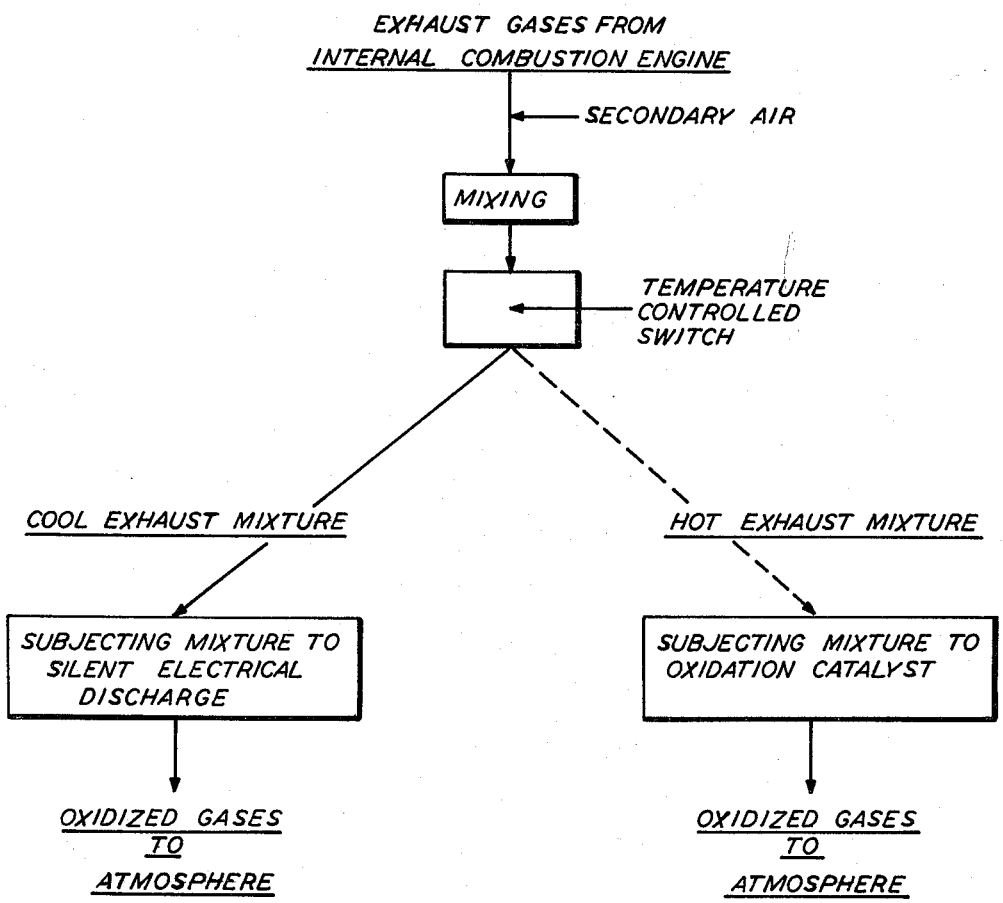

This invention relates to a novel treatment of exhaust gases from an internal combustion engine and relates especially to the treatment of the gases in a manner such as to prevent or to minimize the discharge into the atmosphere of unburned or partially burned constitutents in the exhaust.

The invention will be further described with reference to the attached drawing which is a simplified flow diagram of the process of the invention.

In recent years there has been widespread appreciation of the necessity of curtailing the quantity of unburned fuel hydrocarbons discharged into the atmosphere because of incomplete combustion of hydrocarbon fuels by industrial furnaces, automobiles and the like. The problem, as it relates to the purification of fumes from internal combustion engines, e.g., gasoline engines, is complicated by the fact that the temperature of the exhaust gases leaving the manifold varies considerably with different phases of engine operation. Thus, when the engine is started up, the gases are at about ambient temperature. As the engine warms up, the exhaust gases become progressively hotter until they attain temperatures typically of the order of 1000° F. to 1200° F. Unburned fuel hydrocarbons are normally present in the exhaust under these various temperature conditions. This is a result of the practical necessity of operating the engine with an air-fuel ratio too low for complete combustion of the fuel. An adequate system for controlling the quantity of unburned exhaust discharged into the environment should be capable of reducing the unburned fuel hydrocarbon content of cold exhaust, as well as hot or warm exhaust.

There has been considerable effort in the past to purify hot exhaust through the use of various oxidation catalysts of the type capable of oxidizing hydrocarbons. The catalysts have relatively high threshold activity temperatures, typically about 600° F. or more. Therefore, these catalysts are ineffectual in oxidizing hydrocarbons when the exhaust is cool and below threshold activity temperature. Further, the catalysts are relatively fragile and tend to lose their activity with use. As a result, the catalyst must be replaced periodically.

A general object of this invention is the provision of a novel method for reducing or eliminating the quantity of unburned or partially burned exhaust discharged into the atmosphere as a result of the incomplete combustion of hydrocarbon fuels by internal combustion engines.

A more particular object is the provision of a method of this character which is effective in oxidizing fuel hydrocarbons in engine exhaust even when the exhaust is at ambient temperature, as during engine start-up.

A specific object is the application of the principle of electrical discharge to the purification of engine exhaust.

A further important object of this invention is the provision of a means for oxidizing fuel hydrocarbons in engine exhaust, which means has essentially infinite life and thereby avoids difficulties inherent in the use of catalytic contact masses which require frequent replacement.

These and other objects and advantages are realized in accordance with this invention whereby, during at least the initial start up of an internal combustion engine, exhaust comprising unburned fuel hydrocarbons in gaseous form is mixed with air and the gaseous mixture is subjected to the influence of a self-sustaining gas-ionizing agent at a temperature below the normal ignition temperature of the mixture in a manner such as to oxidize substantially completely hydrocarbons in the exhaust (forming carbon dioxide and water as the principal oxidation products). The gas stream thus treated may then be discharged into the atmosphere.

This treatment permits the substantially full oxidation of fuel hydrocarbons in engine exhaust even when the exhaust leaving the manifold is at a temperature too low for effective operation of the usual oxidation catalysts.

The preferred method for exciting the hydrocarbons in the exhaust to activate them for oxidation is by continuously introducing the gaseous mixture of exhaust and secondary air into and through an electrical discharge reaction chamber, using either a silent electrical discharge, glow discharge, point discharge or corona discharge. Silent electrical discharge is especially recommended. Means for subjecting a gaseous stream to a silent electrical discharge on a continuous basis are well known to those skilled in the art. A suitable system may comprise an enclosed reactor having an exhaust gas inlet, a gas outlet, an electrode within the reactor chamber, an electrode external to the reaction chamber and means for continuously supplying high voltage to the electrodes.

An eductor can be used to form the mixture of gas from the engine manifold with secondary air. The rate of air flow through the eductor can be controlled to maintain the desired pressure of the unburned fuel elements in the mixture of exhaust and secondary air in order to obtain the desired full oxidation by the particular electrical discharge device that is used.

In accordance with one form of the invention, when the engine exhaust reaches the threshold activity temperature of an oxidation catalyst, the gas-ionizing reactor is cut out, as by a thermally actuated valve. The exhaust from the manifold is then mixed with air and, without passing through the gas-ionizing reactor, the mixture is passed into a chamber containing a suitable oxidation catalyst. Any oxidation catalyst may be used which maintains its catalytic activity even after prolonged contact with high temperature exhaust gases. Examples of suitable catalysts are $V_2O_5$, $K_2Cr_2O_7$ and elemental platinum. These or other hydrocarbon oxidation catalysts are supported on a suitable hard base material which is usually in granular form. The eductor used to supply secondary air to a chamber containing an oxidation catalyst may be the same eductor used to supply secondary air to the exhaust gas before it is charged to the electric discharge reactor or a different eductor may be used. By this method, unburned or partially burned hydrocarbons in engine exhaust are efficiently oxidized into innocuous compounds during all phases of engine operation.

I claim:

A method for treating engine exhaust gases which progressively increase in temperature ranging from ambient temperature to elevated temperature at which an oxidation catalyst is active, said method comprising continuously mixing said exhaust gases with air, contacting said mixture with means responsive to the temperature of the mixture for controlling the flow in a manner such that the mixture can flow alternately into contact with a silent electrical discharge and into contact with an oxidation catalyst, said mixture passing into contact with said silent electrical discharge and being oxidized thereby when the temperature of the mixture is below the temperature of threshold activity of said catalyst and passing into contact with said oxidation catalyst and being oxidized thereby when the mixture attains a temperature of the threshold activity of said catalyst, removing oxidized gases as they are formed and discharging oxidized gases into the atmosphere.

References Cited by the Examiner
UNITED STATES PATENTS

| | | | |
|---|---|---|---|
| 1,298,889 | 4/19 | Chance | 204—164 |
| 1,756,897 | 4/30 | Bilsky | 23—2.2 |
| 2,942,932 | 6/60 | Elliott | 23—2.2 |

MAURICE A. BRINDISI, *Primary Examiner.*

BENJAMIN HENKIN, *Examiner.*